June 30, 1970  B. C. MATHEWS  3,517,490
SNAPPER MECHANISM AND CORN HARVESTER EMBODYING SAME
Filed March 22, 1967  6 Sheets-Sheet 1
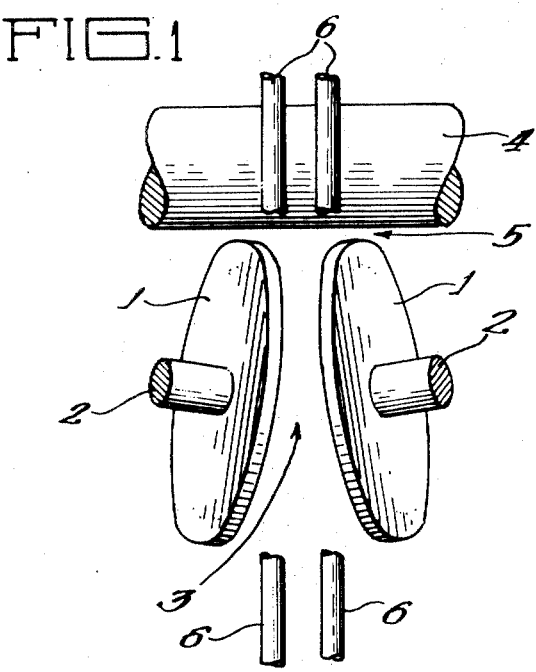
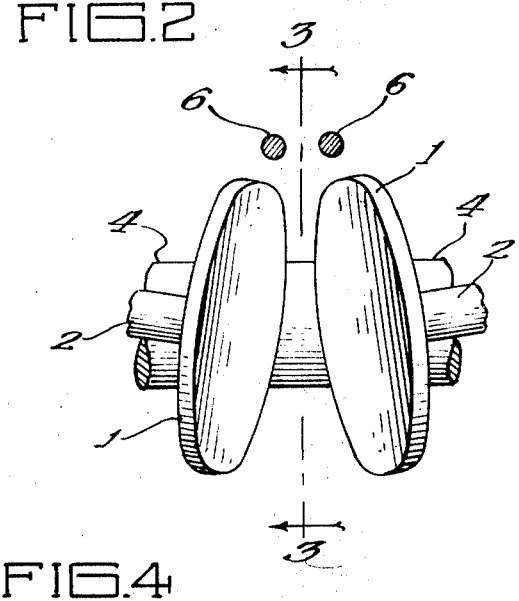
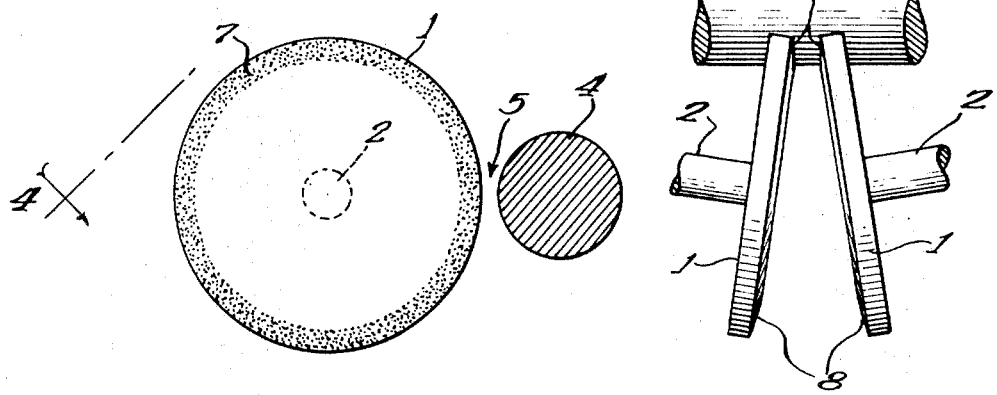
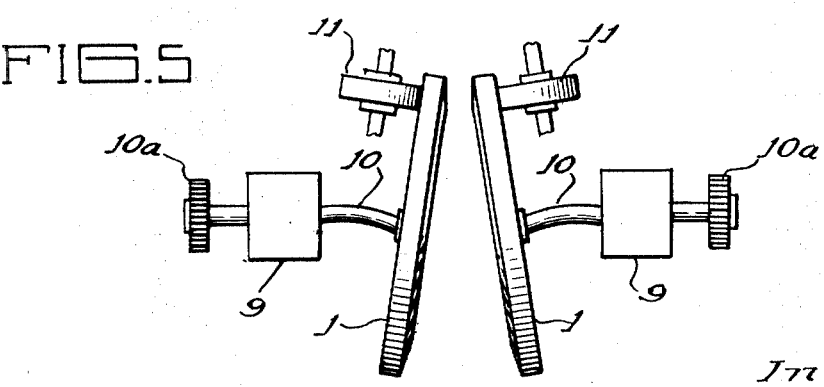
Inventor:
Bernard C. Mathews
By: Zabel, Baker, York,
Jones & Dithmar
Attorneys

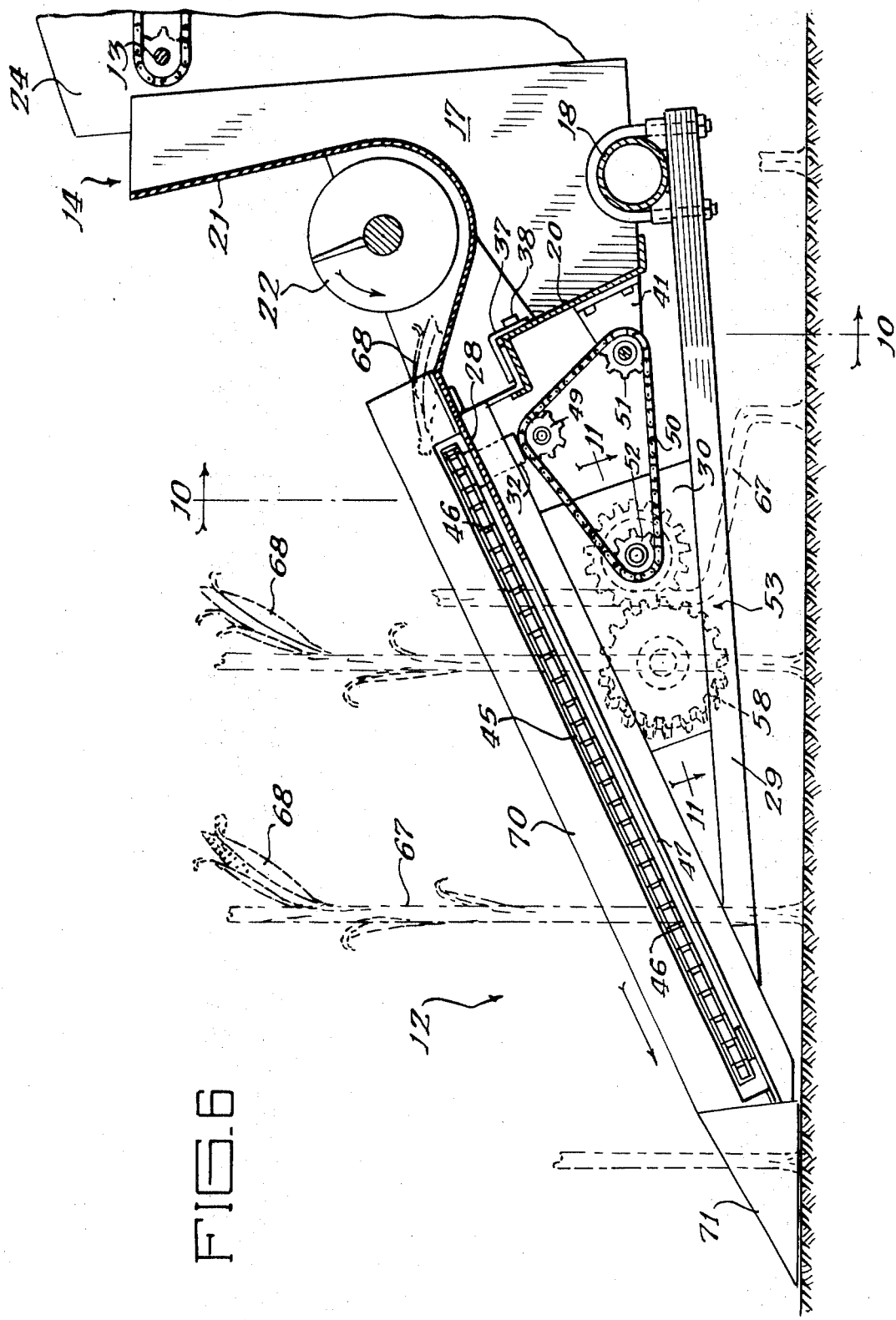

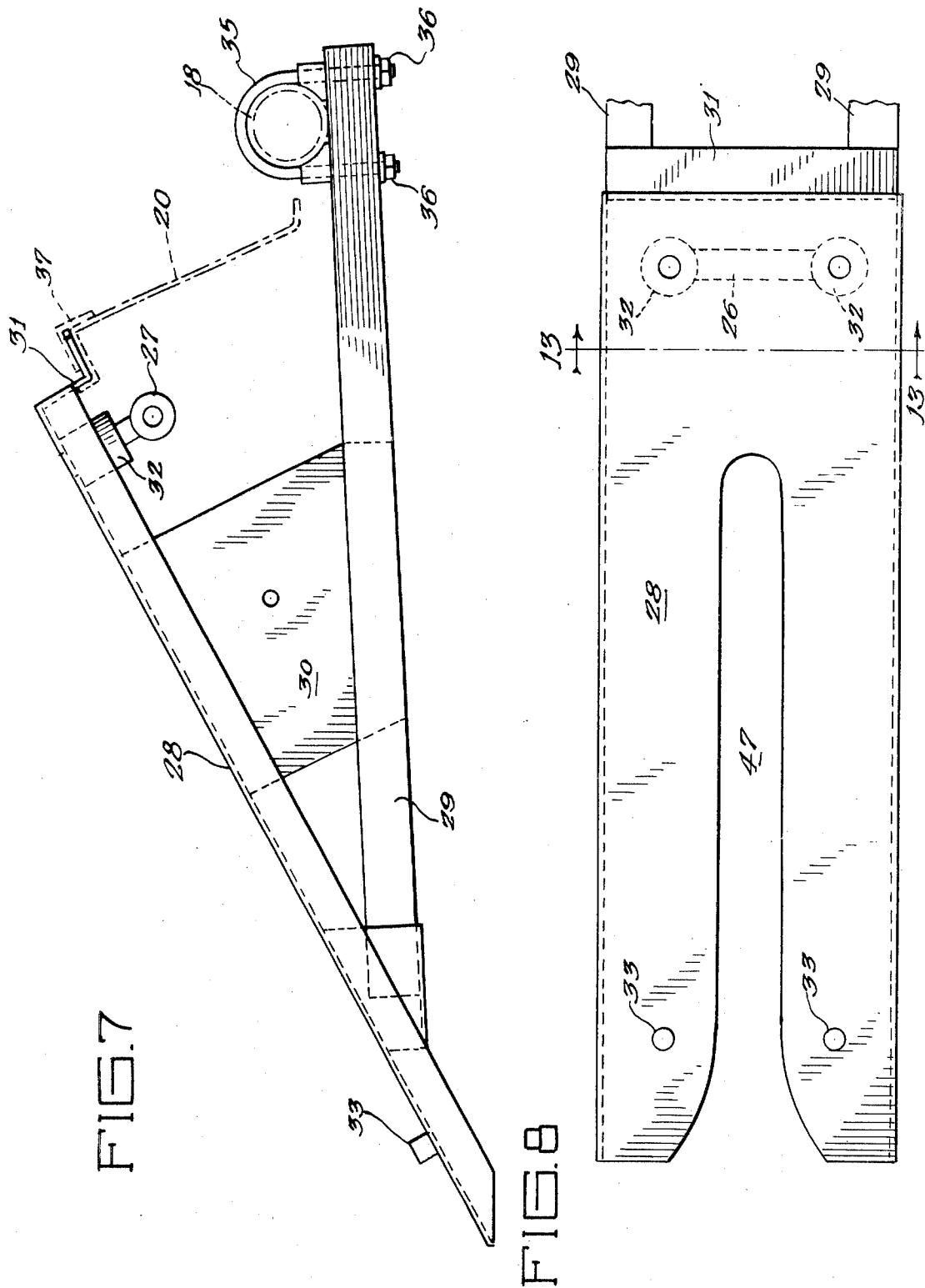

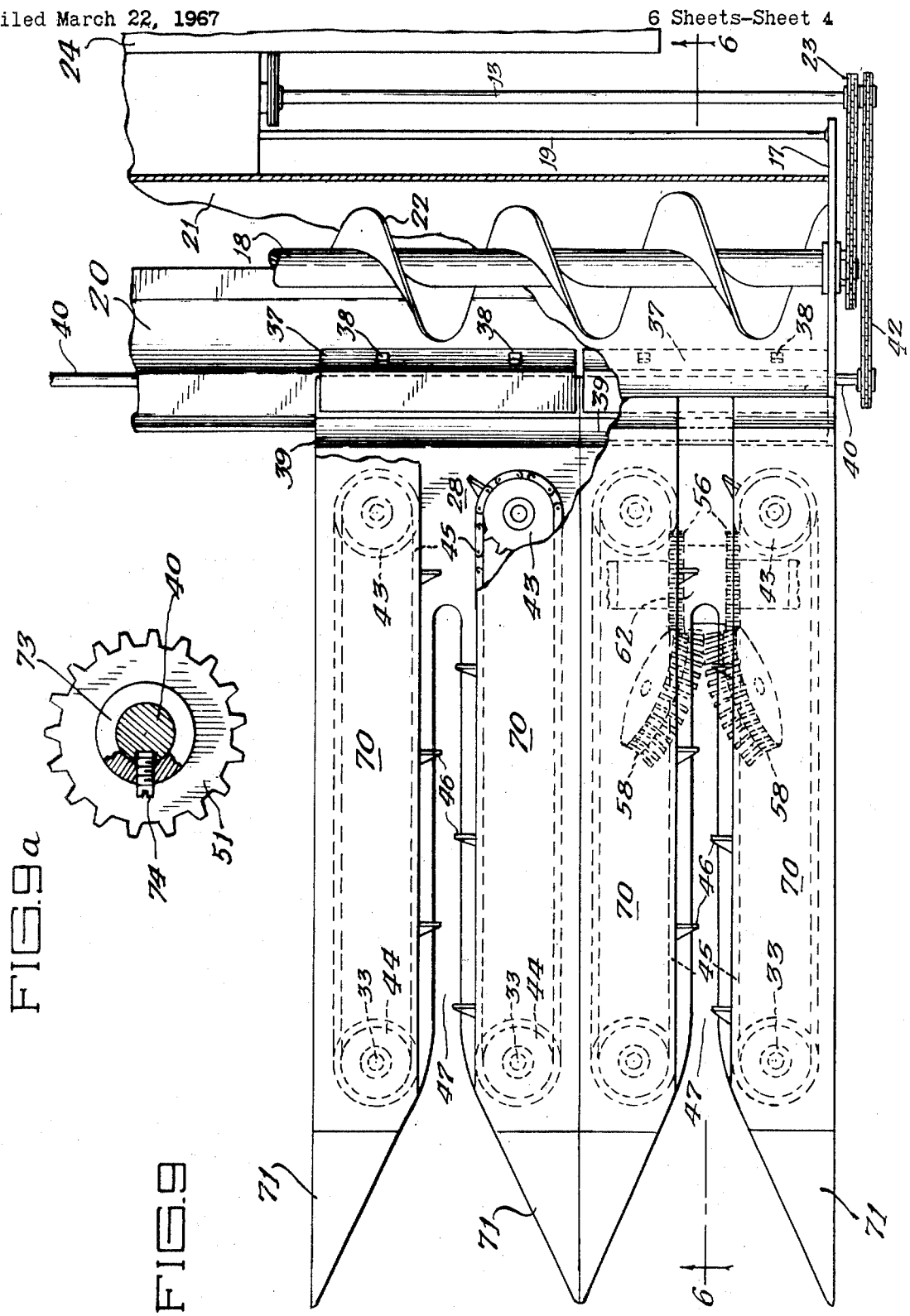

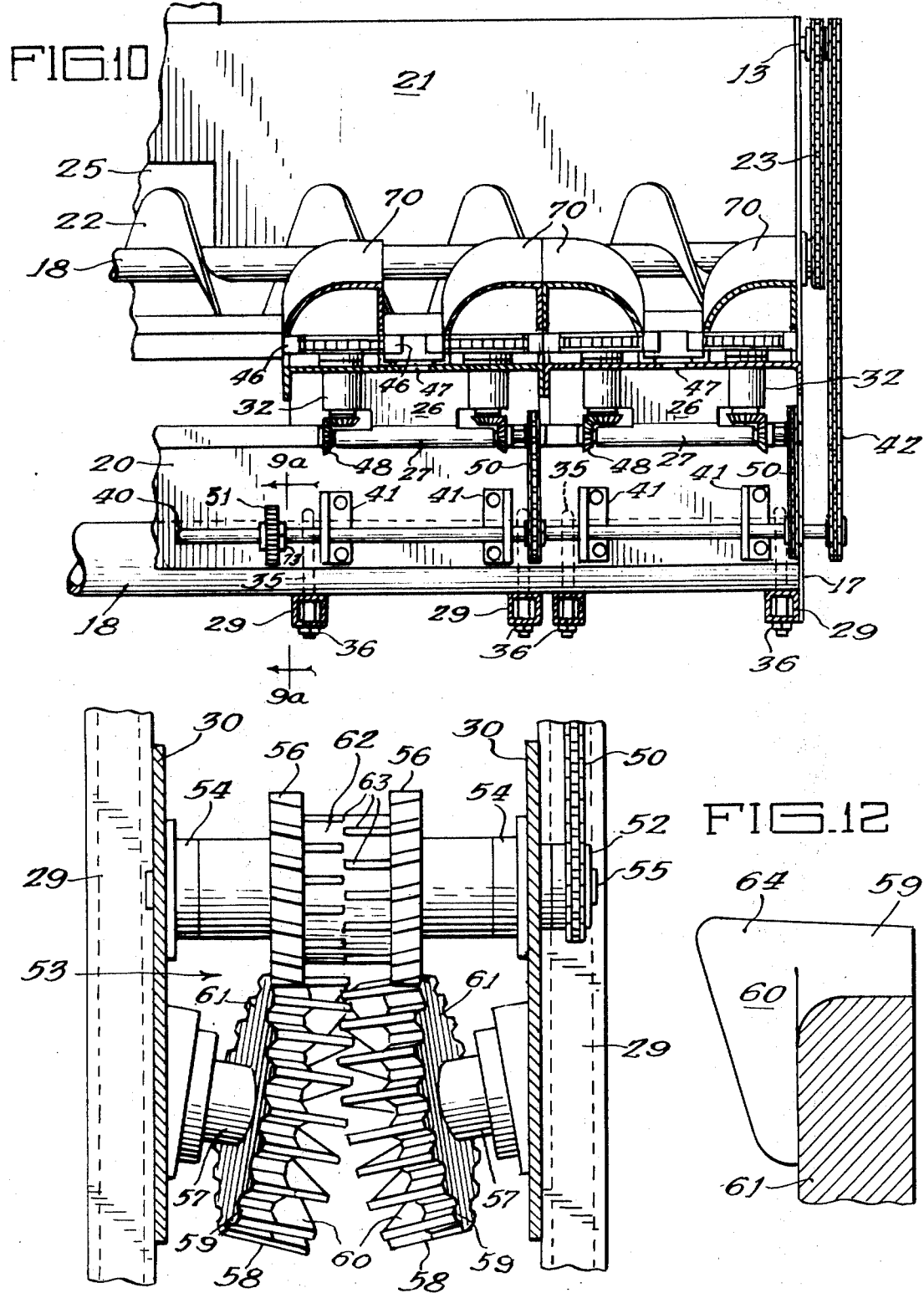

June 30, 1970        B. C. MATHEWS        3,517,490
SNAPPER MECHANISM AND CORN HARVESTER EMBODYING SAME
Filed March 22, 1967        6 Sheets-Sheet 6
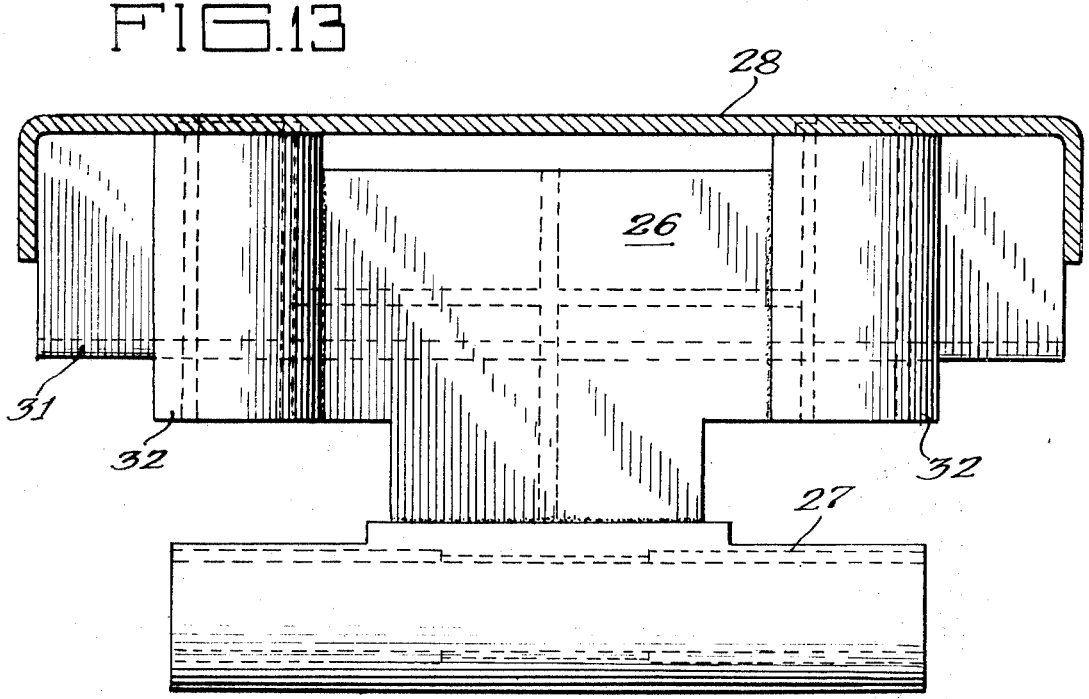
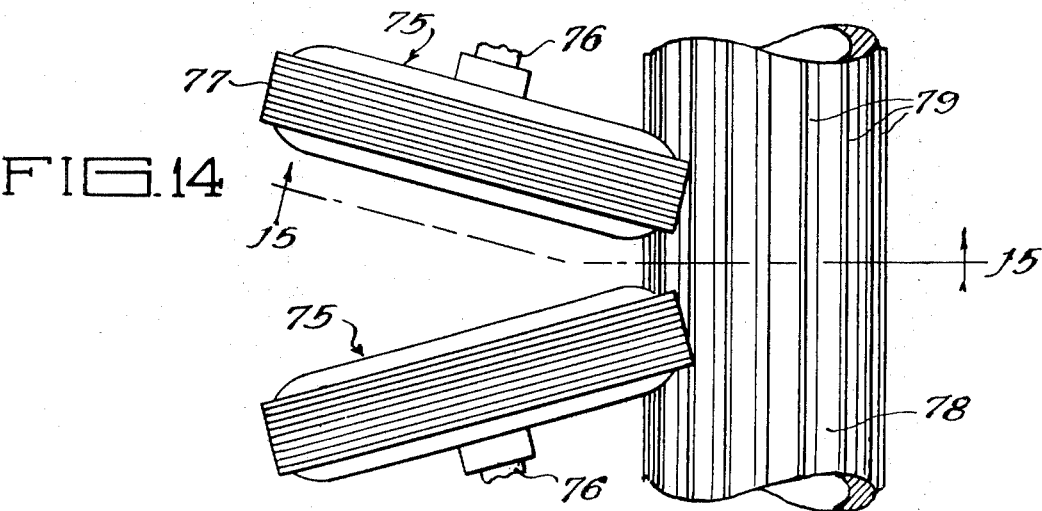
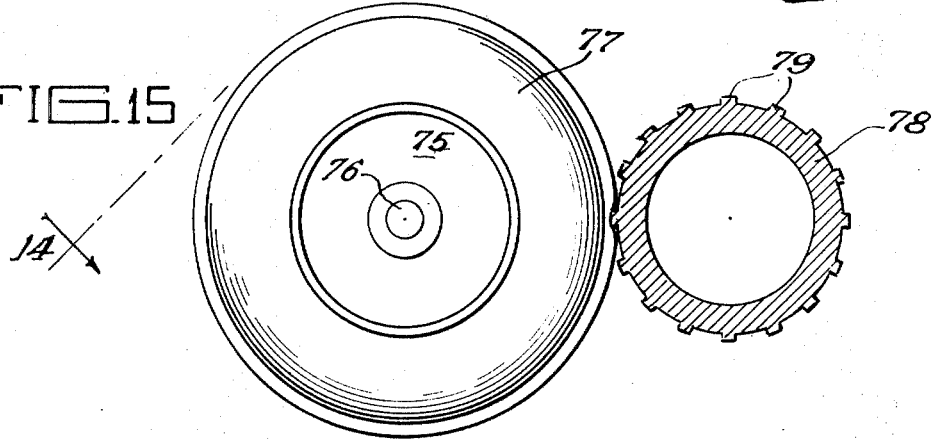

United States Patent Office 3,517,490
Patented June 30, 1970

3,517,490
SNAPPER MECHANISM AND CORN HARVESTER EMBODYING SAME
Bernard C. Mathews, Box 70, Crystal Lake, Ill. 60014
Filed Mar. 22, 1967, Ser. No. 625,251
Int. Cl. A01d 45/02
U.S. Cl. 56—18      10 Claims

ABSTRACT OF THE DISCLOSURE

A corn harvester includes a plurality of head units adjustably mounted side by side on a support structure. Each head unit carries gathering chains on the upper surface of a slotted plate, and snapping wheel mechanism below it engages a corn stalk and draws it downwardly through the slot so that the ear is snapped off. The snapping wheel mechanism comprises two wheels which converge upwardly and rearwardly to provide a forwardly facing bite which engages the stalk and draws it rearwardly and downwardly through a vertically oriented bite provided by a back-up roller. A common drive shaft on the support structure is provided for the gathering chains and snapper mechanism of all units. The drive sprocket for each head unit is adjustably mounted on the drive shaft to accommodate the adjustable spacing of the head units.

---

The present invention relates to an improved snapper mechanism for corn harvesters and to a corn head attachment embodying same.

Corn harvesters are frequently in the form of attachments to a combine so that a single piece of apparatus can move through the field to harvest the ears, remove the husk and strip kernels from the cob. The harvester attachment is known in the trade as the corn head. The corn head is of a width sufficient to harvest several rows of corn at a time, a separate harvester or head unit being provided for each row.

The principal harvesting step is that of ear snapping. As the head unit advances, the corn stalk becomes entrained in a slot. Means are provided to grasp the stalk and pull it downwardly through the slot which is too narrow to accommodate the ears. As a result the ears are snapped from the stalk. The edges of the slot are often referred to as snapping bars. Gathering chains are customarily provided which tend to maintain the stalk upright and guide it through the slot, and also to carry the removed ears up to an auger or other lateral transporting arrangement from which the ears are ultimately fed into the combine.

The stalk engaging means have customarily been in the form of long tapering rollers about three inches in diameter, known as snapping rolls.

The above arrangement requires considerable drive mechanism and bevel gearing for the reason that the snapping rolls are on a substantially horizontal longitudinal axis; the gathering chain sprockets are on a vertical axis, and the drive shaft is on a horizontal transverse axis. The long snapping rolls represent a considerable amount of metal. Thus the snapping rolls and the mechanism are relatively costly. Also, due to the bulk of the mechanism, it is difficult to design a head unit of a width dimension less than 20 inches.

In an effort to obtain a higher yield per acre, the tendency has been to plant the rows closer together. 40 inches was at one time the common row spacing, but in many fields it has been reduced to 30 inches or even 20 inches. A 15-inch row spacing has even been proposed, but one difficulty with this is that of designing a corn head that can be spaced on 15-inch centers, for the reasons pointed out above.

It is an object of the present invention to provide a snapping mechanism which is of small transverse dimension so that it may be incorporated in a corn head unit which is sufficiently narrow so that it can be used for harvesting 15-inch rows, as well as wider rows.

Another object is to provide snapping elements which rotate on substantially transverse axes, but which nevertheless are arranged so as to provide a forwardly facing bite to effect initial engagement of the stalk.

According to my invention, the bite forming elements are used to feed the stalk into a second bite which then operates to draw the full length of the stalk downwardly through the snapping bars.

These bite forming elements are wheel-like elements which I term "snapping wheels" and which are spaced from each other and inclined from the vertical so as to provide a V-shaped opening or bite which faces at least partially in the forward direction. The snapping wheels are rotated in a direction such that the upper portion moves rearwardly and the upper rear quadrant moves rearwardly and downwardly. The second bite is provided by a transverse back-up roller located rearwardly of the wheel-like elements.

In its simplest form, the bite forming elements are in the form of two discs which are mounted on nonaligned stub shafts. Each shaft, although essentially transverse, is inclined somewhat forwardly and downwardly so that the space between the discs will provide a V-shaped bite when viewed from the top, and so that the narrowest part of the bite will occur at about the 45° point, measured rearwardly from the upper vertical radius.

Another problem encountered in the design of the corn head attachment is that of providing means for adjusting the spacing of the head unit centers so that the corn head can be used for fields which have different row spacings. According to this aspect of my invention, the head units are slidably mounted on a supporting structure which also includes a drive shaft extending the full width of the corn head. The drive sprocket for each head unit is mounted for axial adjustment on the drive shaft to correspond to the spacing of the head units.

A further object of my invention is to provide a simple and rigid framework for each head unit which is designed in such a fashion that the various sprockets and gears can be mounted for the most part directly on the structural members themselves, thus eliminating the numerous brackets and cross members generally required in the usual head unit.

A still further object is to provide a head unit which is readily removable from the supporting structure incident to adjustment of the center spacing of the head units.

FIG. 1 is a plan view showing a simplified form of my invention, the snapping bars being partially broken away;

FIG. 2 is a front elevation of FIG. 1;

FIG. 3 is a side elevation of the snapping wheel taken along line 3—3 of FIG. 2, also showing the roller in section;

FIG. 4 shows a modified snapping wheel the view being taken in the direction of the 45° arrow 4 of FIG. 3;

FIG. 5 is a similar view of a further modification, the roller being omitted;

FIG. 6 is a sectional side elevation of a corn head embodying my invention, taken along the line 6—6 of FIG. 9;

FIG. 7 is a side elevation of the framework of the head unit shown in FIG. 6;

FIG. 8 is a fragmentary plan view of FIG. 7;

FIG. 9 is an enlarged plan view of FIG. 6, partially broken away;

FIG. 9a is a fragmentary vertical section taken along line 9a—9a of FIG. 10 showing the adjustable mounting for the drive sprocket;

FIG. 10 is a vertical section taken along line 10—10 of FIG. 6;

FIG. 11 is a plan section taken along line 11—11 of FIG. 6;

FIG. 12 is an enlarged detail showing the shape of one of the teeth, the body of the gear being shown in section;

FIG. 13 is an enlarged section taken along line 13—13 of FIG. 8;

FIG. 14 is a view of a further modification of my invention taken in the direction of the arrow 14 of FIG. 15; and FIG. 15 is a vertical section taken along line 15—15 of FIG. 14.

The principle of my improved snapping mechanism is shown diagrammatically in FIGS. 1 to 3 in which a pair of driven discs 1 are mounted on separate shafts 2. The shafts 2 are inclined downwardly and forwardly so as to provide a bite 3 which is oriented at least partially in a horizontal direction, as indicated in the plan view FIG. 1. Thus as the mechanism moves forwardly, and as soon as a stalk enters the bite 3, the stalk will be grabbed by the bite 3 and rapidly drawn rearwardly and downwardly. A back-up roller 4 is located rearwardly of the discs 1 and provides a second bite 5 (FIG. 3) which draws the remainder of the stalk downwardly. As it is drawn through the snapping bars 6 which overlie the discs, the ear will be snapped off.

The effective portion of the disc is the peripheral area of its face as shown by the stippling 7 in FIG. 3. This peripheral area 7 may preferably be roughened or serrated to improve the gripping action. As shown in FIG. 4, the peripheral area may be beveled as indicated by the reference numeral 8.

The shafts 2 may be driven by suitable means, not shown, and the roller 4 is preferably driven, although it may be an idler.

An alternative arrangement is shown in FIG. 5 in which aligned bearings 9 are provided for resilient shafts 10, such as a shaft made of nylon. Rollers 11 engage the discs 1, urging them toward each other at the 45° position, thus deforming the flexible shafts. The sprockets 10a are in parallel planes and can be driven by chains from a common drive shaft in the usual manner.

FIGS. 6 to 13 show a corn head 12 which embodies a plurality of snapping mechanisms, the corn head 12 being mounted on the front portion of the combine 24 by conventional means, not shown. A transverse power supply shaft 13 is suitably journaled in the combine 24 for supplying power to operate the corn head.

The corn head comprises a mounting structure 14 which runs the full width of the combine, and a number of head units 15 adjustably mounted on the mounting structure 14.

The mounting structure 14 comprises end plates 16 and one or more intermediate plates 17 of like shape, and various transverse members, such as a transverse tubular member 18, a tie rod 19 and a formed plate 20 which is of a general Z-shape. The transverse members are welded to the plates 16 and 17 to provide a rigid structure.

The end and intermediate plates 16 and 17 are shaped to support a sheet metal trough 21 in which is located an auger 22 for feeding ears of corn from either end of the corn head toward the middle where it is moved upwardly and rearwardly into a feed spout 25. Chain and sprocket means 23 are provided for driving the auger 22 from the power supply shaft 13.

The structure of one of the self contained head units 15 is shown in FIGS. 7, 8 and 13. The unit comprises a slotted top plate 28, flanged at the edges, lower strut members 29 made of rectangular tubing, and side plates 30, thus forming a generally triangular structure when viewed in elevation. A transverse angle 31 is located at the rear edge of the top plate 28. Two bushings 32 are secured to the underside of the top plate toward the rear, and support a horizontal bearing sleeve 27 through a plate 26. Stub shafts 33 are secured to the upper surface of the top plate at the front.

The unit 15 is adjustably supported from the mounting structure 16 by means of U-bolts 35 and nuts 36 which embrace the transverse tubular member 18, and clamp the struts 29 thereto. The upper rear portion of the head unit is clamped to the Z-plate 20 by an angle shaped clamp plate 37 which engages the angle 31, and is held by bolts 38. The clamp plate 37 maintains the corner of the angle 31 in engagement with a flange 39 of the Z-plate 20 (FIG. 6).

A drive shaft 40 for the head units extends the full width of the mounting structure 14 and is journaled in brackets 41 bolted to the front surface of the Z-plate 20. The drive shaft 40 is driven from the power supply shaft 13 by chain and sprocket means 42, as shown in FIGS. 9 and 10.

Each head unit 15 mounts a pair of gathering chains 45 and a snapping wheel mechanism 53, as shown in FIG. 9. Sprockets 43 and their shafts are mounted in the bushings 32 and sprockets 44 are also mounted on the stub shafts 33. The gathering chains 45 are trained around the sprockets 43 and 44, each chain having lugs 46 which engage the stalks and tend to feed them rearwardly with respect to the advancing corn head. Thus the stalk is gathered into the slot 47 of the top plate 28.

A bevel gear assembly 48 (FIG. 10), supported by the bushings 32 and sleeve 27, drives the sprockets 43 and gathering chains in the desired direction, the bevel gear assembly including a drive sprocket 49 (FIG. 6), which meshes with a chain 50 which is trained around a sprocket 51 on the drive shaft 40 and a sprocket 52 mounted in one of the side plates 30.

Thus as the corn head advances, the gathering chains 45 gather the corn stalks into the slot 47 so that they may be engaged by the snapping wheel mechanism 53 and drawn downwardly through the slot, the edges of the slot 47 constituting snapping bar means so that the ear of corn 68 is snapped off of the stalk 67 and fed rearwardly and upwardly by gathering chains 45 into the auger trough 21.

As shown in FIG. 11, aligned bearings 54 are mounted on the side plates 30, and receive a shaft 55 on which spaced drive gears 56 are mounted, the sprocket 52 being also mounted on the shaft 55.

In this embodiment of my invention, the snapping wheel mechanism 53 is in the form of a pair of gears 58 and a roller 62, the gears being mounted on forwardly and downwardly inclined stub shafts 57. The latter are journaled in suitable bearing units 65 mounted on the inner surface of each side plate 30.

As shown in FIG. 12, the teeth of each snapping gear 58 have radial portions providing spur teeth 59 and laterally extended portions providing face teeth 60 which form the forwardly facing bite. The reference numeral 61 represents the body of the gear 58. The spur teeth 59 mesh with the drive gears 56 and the face teeth 60 mesh with the face teeth of the oppositely disposed gear 58 to form an intermeshing bite which provides a more positive engagement with the stalks than the arrangement shown in FIGS. 1 to 4.

The roller 62 is mounted on shaft 55 between the drive gears 56 and is provided on its surface with ribs 63 which cooperate with the outer edges 64 of the face teeth 60.

The substitution of the face teeth 60 for the frictional gripping surfaces 7 or 8 of FIGS. 1 to 4 not only provides a more positive engagement of the stalk with the gripping means, but also extends the range of the bite from a few degrees on either side of the 45° position to 45° or more on either side of the point of maximum mesh. The face teeth 60 have a thickness considerably less than their spacing to provide sufficient clearance to accommodate more than one stalk. The face teeth thus engage the stalk 67 and draw the stalk rearwardly and downwardly to a point where the stalk is engaged between the face teeth edges 64 and the roller ribs 63. These elements draw the remainder of the stalk 67 downwardly through the snapping bar means 47.

The width of the roller 62 is sufficient to accommodate several stalks side by side, and the clearance between the face teeth edges 64 and the roller ribs 63 is substantial so that when several stalks are entrained between the roller and the face teeth edges, no jamming will occur. When several stalks are entrained, they will tend to move to either side of the center line so that they will pass through the bite 5 in a side by side relation. By increasing the diameter of the roller 62 so that an effective pitch circle is provided for the staggered ribs 63 which is coincident with the pitch circle of drive gears 56, it is possible to provide a loose intermeshing engagement of elements 64 and 63 having sufficient clearance to engage the stalk without shearing same.

Due to noncoplanar relationship of the axes of the gears 56 and 58, the teeth 59, or 59–60, may be slightly skewed with respect to the gear body 61 to improve the mesh of the spur teeth 59 with the teeth of the drive gear 56 which are also skewed as shown in FIG. 11.

When the head units 15 are mounted on the tubular member 18 and the Z-plate 20 in abutting relationship as shown in FIG. 9, a 15-foot corn head will accommodate twelve head units for harvesting twelve rows of corn. In a field which has a different row spacing such as 20-inch rows or 30-inch rows, several head units may be removed and the spacing of the remaining head units adjusted accordingly. Removal is readily accomplished by removal of the U-bolts 35 and the clamp plates 37.

Adjustment of the spacing of the remaining head units is accomplished by loosening the U-bolts 35 and the clamp plates 37, which permits the unit to be shifted laterally. The drive shaft 40 is preferably slotted or drilled as shown in FIG. 9a, and the sprocket 51 is keyed thereto by a suitable set screw 74 which passes through the hub 73 of the sprocket 51. This arrangement permits the sprockets to be shifted laterally to correspond with the adjusted spacing of the head units so that each sprocket 51 will be located in the same plane of rotation as the gathering chain drive sprocket 49 and the snapping wheel drive sprocket 52.

The mounting brackets 41 for the drive shaft 40 are so located that their location does not interfere with the desired placement of the sprockets 49 for standard row widths; for other row widths the brackets can be relocated by providing suitable holes for the attaching bolts. When shifting row width, the nonfunctional sprockets may be left in their original position.

The two intermediate plates 17 are located to avoid interference with placement of the U-bolts 35 in any one of the standard row widths.

As shown in FIGS. 9 and 10, a housing or shell 70 is provided for each gathering chain 45 and overlies the same to leave the gathering chain free of stalks and leaves. The housings are slotted at one edge to accommodate the gathering lugs 46. Thus there are two housings 70 for each unit; when the spacing is changed, a filler shell may be positioned in the space between adjacent units. Pointed snouts 71 are mounted at the front end of each shell 70 which lift up fallen stalks and divert them laterally so that they may be drawn through the slot 47.

As shown in FIG. 6, each head unit 15 is cantilevered forwardly from the transverse members 18 and 20, and the mounting means for the corn head is adjustable so that the lower edge of the snout is at ground level. However, neither the snout nor the front part of the head unit 20 takes up any of the weight of the head unit. One advantage of my snapper mechanism is that it does not extend up to the very front of the head unit as in the case of customary snapping rolls, with the result that the center of gravity of the head unit is closer to the transverse supporting members 18 and 20 than would ordinarily be the case. Thus the desired cantilevered mounting of the head unit is more easily obtained than would be the case with longitudinally extending snapping rolls.

A further modification of my invention is shown in FIGS. 14 and 15 in which the snapping wheels 75 are in the form of ordinary vehicle wheels mounted on inclined stub shafts 76 and are provided with rubber tires 77. Thus the peripheral portions of the snapping wheels, being of rubber, provide good frictional engagement with the stalks. The snapping wheels 75 are engaged and driven by the roller 78 which is preferably provided with ribs 79 to improve the driving engagement. Thus, a very simple and effective snapping mechanism is provided which eliminates some of the mechanism required in the arrangements shown in FIGS. 6 and 11. The roller 78 may extend the full width of the corn head and serve as a common drive for the snapping wheels of all of the head units.

The location of the narrowest part of the bite 3 can be varied from the 45° location shown in FIGS. 1 to 4, and the location of the upwardly facing bite 5 can be varied from the 90° position shown in FIG. 3. In FIGS. 6 and 11, the upwardly facing bite is located at about the 75° position to bring the bites 3 and 5 closer to each other. Similarly, the angular spacing of the snapping wheels 1 may be varied from the 20° spacing shown in FIG. 4 without impairing the effectiveness of the snapping wheels in engaging the stalk initially and transferring it to the transverse upwardly facing bite 5.

Since the snapping wheels 1 rotate on axes which are generally horizontal, a more simple drive mechanism is required than in the case of the usual longitudinal snapping rolls.

Although only preferred embodiments of the present invention have been described herein, it will be understood that various modifications and changes may be made in the constructions shown.

I claim:

1. Snapper mechanism for a corn harvester or the like comprising snapper bar means providing a longitudinally extending slot for guiding a stalk in relative rearward motion, a pair of wheel-like elements located beneath said snapper bar means and providing a forwardly facing bite for engaging a stalk moving rearwardly through said slot and for pulling it rearwardly and downwardly through said slot, and roller means located rearwardly of said wheel-like elements and cooperating therewith to provide an upwardly facing bite for engaging the stalk initially engaged by said wheel-like elements and pulling it downwardly.

2. Snapper mechanism as claimed in claim 1 in which the axes of said wheel-like elements are generally horizontal, but are each inclined forwardly and downwardly from the horizontal in a forwardly and downwardly converging relationship, said roller means comprising a roller mounted for rotation about a horizontal axis.

3. Snapper mechanism as claimed in claim 2 which includes a shaft mounting said roller, means for driving said shaft, axially spaced gears on said shaft, said wheel-like elements including spur teeth meshing with said spaced gears and face teeth meshing with each other.

4. Snapper mechanism as claimed in claim 2 in which said wheel-like elements include rubber tires, stub shaft means for mounting said rubber tires and maintaining them in contact with said roller, and means for driving said roller.

5. Snapper means as claimed in claim 1 in which the planes of rotation of said wheel-like elements are each inclined to the vertical, said wheel-like elements providing spaced peripheral portions which are rearwardly and upwardly converging to present a forwardly facing bite, and in which said roller means comprises a roller mounted for rotation about a horizontal axis.

6. Snapper mechanism as claimed in claim 5 in which said spaced peripheral portions comprise face teeth.

7. Snapper mechanism as claimed in claim 6 in which said roller has ribs on its surface, the outer edges of said face teeth cooperating with said ribs to form said upwardly facing bite.

8. Snapper mechanism as claimed in claim 5 in which the narrowest part of said forwardly facing bite is located at substantially 45° rearwardly from the upper vertical radius.

9. Snapper mechanism as claimed in claim 5 in which said planes of rotation are substantially 20° apart.

10. A head unit for a corn harvester comprising a framework having a slotted top plate and side plates, a pair of snapping wheels located beneath said top plate, a pair of stub shafts mounted on the inner surfaces of said side plates and extending toward each other for mounting each of said snapping wheels, said stub shafts being each inclined forwardly and downwardly from the horizontal to provide a forwardly facing bite for said snapping wheels, means for rotating said snapping wheels in a direction such that the upper portions thereof move rearwardly so that a stalk entering said bite will be engaged by said snapping wheels and drawn rearwardly and downwardly, and a roller horizontally mounted in said side plates and cooperating with said snapping wheels to impart continued downward movement to said stalk.

References Cited
UNITED STATES PATENTS

| | | | |
|---|---|---|---|
| 2,333,901 | 11/1943 | Swenson | 56—104 |
| 2,676,450 | 4/1954 | Schaaf et al. | 56—18 X |

ROBERT E. BAGWILL, Primary Examiner

S. C. PELLEGRINO, Assistant Examiner

U.S. Cl. X.R.

56—109